United States Patent [19]

Jaskowski

[11] Patent Number: 4,847,140

[45] Date of Patent: Jul. 11, 1989

[54] NONWOVEN FIBROUS INSULATION MATERIAL

[75] Inventor: Michael C. Jaskowski, Pittsburgh, Pa.

[73] Assignee: Helmic, Inc., Pittsburgh, Pa.

[21] Appl. No.: 721,042

[22] Filed: Apr. 8, 1985

[51] Int. Cl.⁴ .................. B32B 5/06; B32B 17/12; E04B 1/76; E04B 1/88

[52] U.S. Cl. .................. 428/220; 19/145.5; 28/112; 156/148; 181/290; 181/294; 428/284; 428/285; 428/286; 428/287; 428/288; 428/300; 428/920

[58] Field of Search ............ 428/220, 284, 285, 286, 428/287, 288, 300, 920; 19/145.5; 28/112; 156/148

[56] References Cited

U.S. PATENT DOCUMENTS

| | | | |
|---|---|---|---|
| 1,942,733 | 1/1934 | Shaver | 112/420 |
| 3,274,046 | 9/1966 | Shannon et al. | 428/319.1 |
| 3,338,777 | 8/1967 | Irwin et al. | 428/300 |
| 3,608,166 | 9/1971 | Gruget | 28/112 |
| 3,649,428 | 3/1972 | Hughes | 112/420 |
| 3,950,587 | 4/1976 | Colijn | 428/311.5 |
| 3,975,565 | 8/1976 | Kendall | 428/284 |
| 4,205,113 | 5/1980 | Hermannsson et al. | 428/296 |
| 4,237,180 | 12/1980 | Jaskowski | 428/280 |
| 4,500,592 | 2/1985 | Lee et al. | 428/920 |
| 4,522,673 | 6/1985 | Fell et al. | 112/440 |
| 4,522,876 | 6/1985 | Hiers | 428/285 |

FOREIGN PATENT DOCUMENTS 2460359 2/1981 France.
1583744 2/1981 United Kingdom.

*Primary Examiner*—James C. Cannon
*Attorney, Agent, or Firm*—Stanley J. Price, Jr.

[57] ABSTRACT

A nonwoven composite fibrous material adaptable as an insulation medium is formed by a loose layer of inorganic fibers, such as rock wool, glass, ceramic, carbon-graphite or the like, bonded together by at least one carrier web layer positioned on a surface of the inorganic fibrous layer. The carrier web layer is a blend of inorganic fibers and organic fibers with the organic fibers comprising about 1% or less by weight of the total nonwoven composite fibrous material. Both organic and inorganic fibers of the carrier web are advanced into interlocking relation with the fibers of the inorganic layer by needle punching the carrier web. The carrier web organic and inorganic fibers have a length greater than the thickness of the inorganic layer in the composite fibrous material so that the needle punching advances organic and inorganic fibers from the carrier web completely through the inorganic layer to mechanically bind together the fibers of the inorganic layer to resist separation of the fibers and delamination of the inorganic layer upon handling and installation.

19 Claims, 1 Drawing Sheet

NONWOVEN FIBROUS INSULATION MATERIAL

BACKGROUND OF THE INVENTION

1. Field of the Invention

This invention relates to a nonwoven fibrous material and, more particularly, to a nonwoven composite insulation material that includes a layer of inorganic fibers bonded together by a carrier web of blended organic and inorganic fibers.

2. Description of the Prior Art

It is well known in the art of thermal and sound insulation to bond together glass fibers in nonwoven, felt-like layers by a resinous binder. The binder may be of either the thermosetting or the thermoplastic type. Examples of this type of insulation material are disclosed in U.S. Pat. Nos. 2,579,035; 2,598,102; 2,612,162; 2,633,433; and 3,144,376. Mineral wool, also identified as rock wool, slag wool, or mineral cotton is a loose fibrous material also known for thermal and sound insulation properties. In addition, mineral wool is used to fabricate synthetic resin-bonded panels for specific structural purposes and has application as a filtering medium and a fire-proofing material.

Mineral wool is an inorganic material in the form of a mass of finely intertwined fibers formed by blowing air or steam through molten rock or slag. A three-dimensional layer of intertwined mineral wool fibers lacks structural integrity since the fibers, even though intertwined, are brittle. Thus, without treatment, a layer of mineral wool fibers lacks structural strength for handling and installation as an insulator, a filter medium, a fireproofing material, etc. To overcome this deficiency, the fibers of a layer of mineral wool must be bonded together so as to resist splitting and delamination of the material when placed in use. Furthermore, because mineral wool is substantially a coarse and abrasive material, special handling procedures are required to permit efficiency in fabrication and use.

It is a known practice to bond together the fibers of a mineral wool layer by the use of resin, as is generally disclosed in U.S. Pat. No. 3,778,334. A thermosetting resin is applied to mineral wool fibers as they are spun to form a mass of intertwined mineral wool fibers. The resin binds the individual fibers together to prevent delamination of the layer. The resin is generally applied in the form of an aqueous solution, such as a water insoluble thermosetting resin in liquid form, an aqueous dispersion of a water insoluble thermosetting resin, or in a dry, powdered finely divided form.

The use of thermosetting resins as binders for mineral wool, or for any fibrous material in general, to form a nonwoven fibrous structure is objectionable because of the health hazard presented during the application of the resin to the fibrous layer. It is a common practice to disperse the resin in both a powder and liquid spray form which causes the resin to circulate into the air presenting an unhealthy working environment. Also, resin in liquid form must be carefully handled so as to prevent contamination of a public water system. For these reasons it is preferred to avoid the use of a resinous binder to form nonwoven insulation materials from inorganic fibers, such as rock wool.

Various alternatives to resin bonding of inorganic fibers to form a nonwoven, felt-like material are disclosed in U.S. Pat. Nos. 2,908,064; 3,317,335; 3,338,777; 3,608,166; 3,616,031; 3,917,448; 3,975,565; 4,081,582; and 4,237,180. U.S. Pat. No. 3,917,448 discloses forming a nonwoven material including a percentage of heat-shrinkable synthetic fibers blended with non-shrinkable fibers into a web in which both the shrinkable and non-shrinkable fibers are randomly arranged in three dimensions. These fibers are so entangled that when exposed to heat treatment the shrinkable fibers contract to mechanically interlock the shrinkable and non-shrinkable fibers and provide the web with a preselected thickness and density.

Similarly, U.S. Pat. No. 4,237,180 discloses an insulation material formed by a blend of organic and inorganic fibers processed by carding or garnetting to form a composite insulating fibrous material or a preselected thickness. About two to ten percent by weight of heat sensitive organic fibers, such as polyester fibers, are oriented within the composite material by a needling process to interlock with the inorganic fibers and compress the composite material to the preseleted thickness. The interlocking arrangement of organic and inorganic fibers are subjected to a shrinking treatment in which the organic fibers contract and bind the inorganic fibers together to form a composite insulating material having a tensile strength sufficient to prevent splitting and delamination of the composite body. However, an essential step in the formation of these types of nonwoven fibrous insulation materials is heat treating the blend of organic and inorganic fibers to shrink the organic fibers so as to bond together the inorganic fibers.

On the other hand, U.S. Pat. No. 4,081,582 employs a similar quantity of organic fibers which are fused by preheating to provide bonding for the overall fibrous material disclosed therein. U.S. Pat. No. 3,601,081, discloses the bonding of felt-like materials where organic fibers are added and then heated and cooled to provide the required bonding.

Several prior art patents disclose composite nonwoven insulation materials formed by superimposing or layering in a preselected orientation loose batts of fibers. The layered batts are sent through a needle loom, such as disclosed in U.S. Pat. No. 2,958,113, that includes a pair of vertically reciprocating needle boards containing an array of barbed needles. With the loose layers stationarily positioned between the boards, the boards are reciprocated so that the needles penetrate the layers. In this manner, the fibers of the outer layers are advanced downwardly and upwardly in the direction of the movement of the needles toward the center layer to entangle the fibers of the various layers and thereby mechanically interlock the layers. The size and the number of needles on the board, as well as the number of punching operations per square inch of the layered material, determine the density and thickness of the composite material.

For example, the nonwoven material formed by the process disclosed in U.S. Pat. No. 2,908,064 includes loose batts of synthetic organic fibrous material which, after needle punching, can also be heated to a suitable temperature to retract the fibers and increase the overall density of the composite material. Meanwhile, U.S. Pat. No. 3,317,335 employs a large quantity of organic fibers which are needle punched into a mat and then heat shrunk to insure proper bonding. Although employing a primary mat of glass fibers which are "connected" by needle punched organic fibers, U.S. Pat. No. 3,608,166 teaches preheating the organic fibers and adding a coating to the glass fibers to facilitate the needling.

Lastly, U.S. Pat. No. 3,975,565 discloses a fibrous structure that includes a plurality of interlayered inorganic fiber mats and organic fiber webs which are held together by needle punching the organic fibers from the outer web into the inorganic mat. The multi-layers are needle punched from both the top and the bottom. As a result the layers are mechanically interlocked. The preferred arrangement is to sandwich the inorganic fiber mat between organic fiber webs. The organic fiber webs are preferably fabricated of natural or synthetic fibers, for example nylon or polyester. It is further disclosed that the inorganic fiber mat can include mats of glass fibers, mineral and clay wool fibers, alumino-silicate fibers, silica fibers, and polycrystalline fibers, such as zirconia or alumina.

The above-mentioned prior art patents disclose various methods of employing organic fibers to form organic and inorganic fiber insulation mats which may be sufficiently strong and flexible to facilitate handling prior to installation. However, it should be recognized that organic fibers are subject to disintegration when exposed to elevated temperatures. In fact, for some high temperature applications, it appears that the composite insulation materials taught hereinabove would contain too high a concentration of organic fibers. As a result, destruction of the organic fibers could sufficiently reduce the mechanical strength and integrity of the insulation material to make it unsatisfactory for such use.

Although U.S. Pat. No. 3,338,777 discloses a fibrous mat which, in one embodiment, includes no organic binder, the inorganic strands must initially be crimped and relatively moved with respect to one another in all directions to insure adequate distortion. Assuming such strands could be obtained, they would appear relatively expensive to provide. In any case, the crimped inorganic strands would then be sent to a cutter machine, a garnett machine, a lapping machine, and a needle loom. Although the completed web material might be sufficiently strong and capable of withstanding higher temperatures, there is no disclosure of the resulting flexibility which can be important during handling and installation and has heretofore been made possible by the inclusion of organic fibers within the mats.

Therefore, there is a need in the formation of nonwoven insulating materials containing primary inorganic fibrous material, such as glass fibers and rock wool, to utilize a minimum amount of organic fibers for bonding together the inorganic fibers in an initial form to provide the desired mechanical strength and flexibility needed for handling prior to and during installation. However, the amount of organic fibers present should be such that, if the organic fibers are exposed to elevated temperatures after installation, their disintegration will not materially affect the mechanical strength and integrity of the composite insulating material.

SUMMARY OF THE INVENTION

In accordance with the present invention there is provided a nonwoven composite fibrous material that includes a layer of inorganic fibrous material containing fibers in an unbonded state. A carrier web is positioned on the layer of inorganic fibrous material. The carrier web includes an admixture of inorganic and organic fibers. The inorganic and organic fibers are blended in a nonwoven structure to provide the carrier web with a preselected thickness and density with the organic fibers of the carrier web preferably comprising about 1% or less by weight of the composite fibrous material. The carrier web is needle punched to the layer of inorganic fibrous material to interlock the carrier web inorganic and organic fibers with the fibers of the inorganic fibrous material layer so as to bond together the fibers of the inorganic fibrous material and form the cohesive, nonwoven composite fibrous material having a mechanical strength and flexibility to resist separation of the fibers of the layer of inorganic fibrous material upon handling.

Further, in accordance with the present invention, there is provided a nonwoven composite insulation material that includes a layer of mineral wool fibers. The layer has a preselected thickness. The fibers of the layer are in an unbonded state. A carrier web is provided for binding together the mineral wool fibers. The carrier web includes an admixture of inorganic and organic fibers. The inorganic fibers preferably comprise at least about 90% by weight of the carrier web. The inorganic and organic fibers are blended to form a nonwoven structure. The carrier web is positioned in contact with the layer of mineral wool fibers. The carrier web is needle punched to the layer of mineral wool fibers to interlock the carrier web inorganic and organic fibers with the mineral wool fibers so as to bond together the mineral wool fibers and form a cohesive, nonwoven composite insulation material.

The present invention is also directed to a process for making a nonwoven fibrous material that includes the steps of blending inorganic fibrous material in a concentration by weight of at least about 90% with organic fibrous material to form a composite nonwoven carrier web having a preselected thickness and density. The carrier web is positioned in overlying relation with a layer of mineral wool fibers. The layer comprises an unstructured concentration of mineral wool fibers of a preselected thickness and density. The carrier web is needle punched to advance the inorganic and organic fibrous material into contact with the mineral wool fibers. The layer of mineral wool fibers is contracted by the interlocking relation of the inorganic and organic fibrous material with the mineral wool fibers to bond together the mineral wool fibers to form a structured composite, nonwoven fibrous material having a preselected thickness and density.

Accordingly, the principal object of the present invention is to provide a nonwoven fibrous insulation material that includes a layer of inorganic fibers bound together by needle punching a carrier web containing a blend of inorganic and organic fibers into interlocking relation with the layer of inorganic fibers to form a composite structure having mechanical strength and flexibility to permit handling without delamination of the layer of inorganic fibers.

Another object of the present invention is to provide a mineral wool insulating blanket that includes at least one carrier web positioned in overlying relation with a layer of mineral wool fibers and needle punched into the mineral wool fibers to provide the insulation blanket with mechanical strength and flexibility for use in thermal and sound insulating applications.

A further object of the present invention is to provide a process for making a nonwoven fibrous material by mechanically interlocking the individual fibers of an inorganic batt, such as a glass fiber batt or a rock wool fiber batt, with a carrier web containing a blend of organic and inorganic fibers so as to provide a composite nonwoven material for application as an insulating medium.

These and other objects of the present invention will be more completely disclosed and described in the following specification, the accompanying drawings, and the appended claims.

DESCRIPTION OF THE PREFERRED EMBODIMENTS

Figure 1:
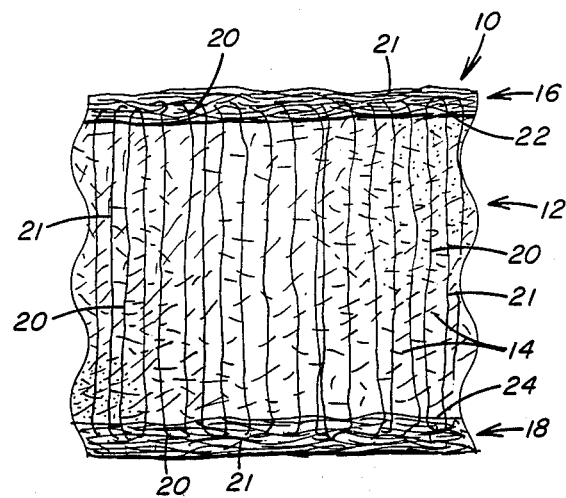
FIG. 1 is a cross sectional view in side elevation of one example of a nonwoven fibrous insulation material, illustrating a layer of inorganic fibers bonded together by needle punching organic and inorganic fibers from top and bottom carrier webs into the inorganic fiber layer.

Referring to the drawings and particularly to FIG. 1, there is illustrated a nonwoven composite fibrous material generally designated by the numeral 10 that includes a primary layer or batt 12 of inorganic fibrous material containing fibers 14 selected from a group that could include mineral wool, glass wool, glass fibers, metal oxide fibers, graphite or carbon fibers, ceramic fibers and the like. The layer 12 of inorganic fibrous material has a pre-selected thickness and density applicable for a specific use as an insulation material, a filtering medium, a fireproofing material, and for other structural purposes. It would not be uncommon for the initial thickness to be within a range of four to eight inches.

The fibrous inorganic layer 12 is a nonwoven structure or a loose batt which is initially formed in an unbonded state, i.e. the inorganic fibers 14 are not initially interlocked. Without further treatment the loose batt lacks the mechanical strength to resist separation of the fibers and delamination of the batt upon handling.

However, in the preferred material 10, the loose batt 12 of inorganic fibers 14 is bound together by one or more carrier webs 16 and 18 which are needle punched to the batt 12, as illustrated in FIG. 1. Each carrier web 16 and 18 includes a preselected blend of organic fibers 20 and inorganic fibers 21. The organic fibers 20 and inorganic fibers 21 are blended in a preselected ratio by weight to form an admixture which is conveyed to a garnetting or carding machine, in a manner which will be discussed in detail hereinbelow, where the fibers are interlaced to form a continuous nonwoven web having a preselected thickness and density. Preferably, the carrier webs 16 and 18 formed in this manner contain at least about 90% by weight inorganic fibers 21 and up to about 10% by weight organic fibers 20. The webs 16 and 18 would preferably combine to contribute a total of about 5% to as much as 10% by weight to the entire composite fiber material 10. Consequently, the layer 12 of inorganic fibers 14 could contribute 90% to 95% or more to the overall weight of the composite fibrous material 10.

The organic fibers 20 are preferably selected from the group consisting of vinylidene chloride fibers, polyolefin fibers, polystyrene fibers, copolymer polystyrene fibers, acrylonitrile fibers, polyamide fibers, polyvinylchloride fibers, polyester fibers, acetate fibers, and other thermoplastic fibers. The inorganic fibers 21 forming the carrier webs 16 and 18 are preferably selected from a group consisting of glass fibers, metal oxide fibers, carbon-graphite fibers and ceramic fibers. The fibers 20 and 21 of the webs 16 and 18 include a substantial portion which preferably have a length which is greater than the eventual compressed thickness of the resultant composite material 10.

It has generally been accepted, if there is a sufficient quantity of each, that the inorganic and organic fibers can be blended in a conventional manner, as by carding, garnetting and the like, to form a nonwoven carrier web of a preselected thickness and density. Prior to such blending the organic and inorganic fibers 20 and 21 would each be in batch form, but the individual fibers should be separated by suitable means to facilitate uniform blending in an admixture. In one such method, the given quantity of organic fibers 20 are distributed onto a conveyor and advanced through a garnett machine which separates the fibers to filament form. The inorganic fibers 21 are also similarly fibers are available for blending. However, it has been found that the organic and inorganic fibers 20 and 21 could only be blended in this conventional manner in a preselected percentage by weight which is significantly different from the proposed percentage of the present invention. Specifically, the surfaces of the untreated inorganic fibers do not have a sufficiently high coefficient of friction to insure a proper blend. Further, it has been found that static electricity can cause the fibers to resist such a carding or blending process.

In accordance with the present invention the organic and inorganic fibers 20 and 21 of each carrier web are blended in a preferred preselected ratio to provide the carrier web with heat resistivity as well as strength and flexibility. This can be accomplished by blending the fibers 20 and 21 to form an admixture as shown in FIG. 1 to provide each carrier web 16 and 18 in a three-dimensional felt-like layer in which a lesser quantity of organic fibers 20 are evenly distributed throughout the inorganic fibers 21. The organic fibers 20 and inorganic fibers 21 should be randomly arranged in the respective carrier webs 16 and 18. However, the fibers 20 and 21 should be blended in the preselected percentage by weight so that the formed carrier web includes at least 90% to 99% by weight inorganic fibers 21 with a selected percentage by weight of organic fibers 20, for example 1% to 10%.

With this preferred ratio of inorganic fibers 21 to organic fibers 20, each carrier web 16 and 18 has a degree of thermal resistivity not withstanding the presence of such a small quantity of organic fibers. Consequently, when the carrier web 16 and 18 is exposed to elevated temperatures, for example in the range of 1,300° F., the structural integrity of the carrier web 16 and 18, and, more significantly, the entire material 10, is not lost by disintegration of the organic fibers.

However, the presence of the preferred quantity of organic fibers 20 in each carrier web 16 and 18 has been found to be sufficient to initially provide the respective carrier web with the strength and flexibility needed for handling and installation of the composite fibrous material 10. The organic fibers 20 function in a composite insulation material 10 having a rock wool layer 12, for example, to prevent splitting or delamination of the rock wool layer 12 during installation as a thermal insulator. On the other hand, after installation, such flexibility is no longer a requirement and loss of some of the organic fibers 20 upon exposure to elevated temperatures can occur at the area of contact with the heat source without affecting the insulation properties of the composite fibrous material 10. Nevertheless, it is the presence of the organic fibrous material in the carrier web which primarily provides the composite fibrous material 10 with the properties of mechanical strength and flexibility needed for handling prior to and during installation.

Accordingly, minimizing the content of the organic fibrous material in the carrier web 16 and 18, and the entire composite material 10 is preferred, particularly for high temperature applications. If the carrier web were predominantly or entirely organic material, then the entire carrier web would be substantially destroyed in such high temperature applications. This could result in a breakdown in the structural integrity of the inorganic fibrous layer, for example rock wool, and an overall failure of the composite insulation material. Therefore, by providing a carrier web 16 and 18 having no more than about 10% by weight organic fibrous material and the entire material 10 with no more than about 1% by weight organic fibrous material, the properties of flexibility and strength are initially present and the thermal resistivity of the carrier web is not lost in high temperature applications.

Even though some of the organic fiber content may be destroyed after the composite insulation material 10 is installed and subjected to elevated temperatures, the integrity of the carrier web 16 and 18 in the composite fibrous material 10 will be maintained because of the presence of at least 90% by weight inorganic fiber content. Thus, the preferred content of the organic fibrous material in the carrier web is not an amount which when exposed to elevated temperatures and consumed results in the destruction of the carrier web. However, it is the organic fiber content of the carrier web which initially enhances the flexibility and mechanical strength of the composite fibrous material.

In order to be capable of providing the desired webs 16, 18, it is appropriate to discuss a specific composition of inorganic glass fibers and organic polyester fibers. It has been found that the blending and carding of an admixture of glass and polyester fibers can be enhanced by a preferred pretreatment process which appears necessary due to the surface characteristics and rigidity in straightness of the glass fibers. It is known that glass fibers may not be conducive to a carding process in which the fibers are separated to form a cohesive web structure. Unless otherwise treated, glass fibers by their nature are not crimped or curled. Therefore, it is necessary to increase the frictional characteristics of the surface of the glass fibers. This is accomplished in the preferred process by causing the glass fibers to be coated with a friction enhancing substance, such as a starch or silica gel. The friction enhancing substance can be applied during the process of fabricating the glass filaments when they are extruded and prior to cutting the fibers into desired staple lengths. On the other hand, because most organic fibers are available in crimped forms and have noncircular cross sections, they do not require an application of any friction enhancing substance.

It has also been found that, in addition to increasing the frictional properties of the glass fibers, it is important to neutralize the effects of static electricity applied to the glass fibers and the organic fibers during the carding process. If an electro-static charge is applied to the glass fibers and/or the organic polyester fibers, they may repel each other and resist the carding and blending process. To overcome the problem of static electricity, the fibers can be sprayed with an anti-static agent, such as water. Spraying the fibers with water increases the humidity of the ambient air. For example, the surrounding air could have a humidity of about 60% and, as a result, the static charge can rapidly dissipate before the blending and carding process to form the web formation.

It should be also understood that for optimum carding and blending of the organic and inorganic fibers, the fiber diameters are preferably maintained within a preselected range, such as 5–50 microns. Most preferably extreme differences in diameters between the organic and inorganic fiber should be avoided, such as, for example, 5–50 microns for one fiber and 50–100 microns for the other fiber. Fiber diameters of this differential could result in "clump-formation" of the "finer" fibers and in a non-homogeneous web. For the needling process, the fiber diameters must be of such dimension as to fit into the barb gap of the needles. A typical needle configuration could produce 50 needle penetrations per square inch of batt surface. Of course, the batts may be run through the needle area a selected number of times, for example, 8 times per face of the batt for a total of 16 passes. Thus, it is preferred that the glass and organic fibers be pretreated prior to the blending process so as to avoid an uneven web formation having large clumps of partially separated glass fibers.

With the carrier webs 16 and 18 preferably processed in the manner described, the layer 12 of inorganic fibrous material shown in FIG. 1 is provided structural strength by needle punching the preferred carrier webs 16 and 18 to a top surface 22 and a bottom surface 24 of the layer 12. Preferably, as mentioned hereinabove, the inorganic fibrous material 12 is selected from the group consisting of mineral wool, glass wool, glass fibers, metal oxide fibers, ceramic fibers, graphite and carbon fibers and the like. The inorganic fibers may be formed to have a preselected diameter and cut to a preselected length. For example, a batt 12 of rock wool fibers can be formed having fiber lengths of one-half to three-fourth inches where the fibers have an average diameter in the range of about 5 to 8 microns with individual fiber diameters ranging from 0.4 to 30 microns.

In one method of the formation of a fiber batt 12, rock wool fibers are fed to a garnett or carding machine to separate the fibers in filament form after they have been cut to the desired length. Carding or garnetting the rock wool fibers forms the three-dimensional felt-like batt 12, as shown in FIG. 1, which has the substantially planar top and bottom surfaces 22 and 24. Prior to needling, the batt 12 has a preselected thickness, for example, about 8 inches.

The formed batt of inorganic fibrous material is then combined with the carrier webs 16 and 18 by the needle punching operation. The carrier web is fed from a roll onto at least a selected one of the top and bottom surfaces 22 and 24 of the inorganic fibrous batt 12. In one method the carrier web is fed from a pair of rolls positioned above and below the inorganic batt. With this arrangement, as shown in FIG. 1, the inorganic fibrous batt 12 is sandwiched between the top carrier web 16 and the bottom carrier web 18.

With the webs 16 and 18 positioned in contact with the top and bottom surfaces 22 and 24 of the inorganic fibrous batt 12, both are needle punched to advance both the organic fibers 20 and inorganic fibers 21 from the webs 16, 18 perpendicularly through the inorganic fibrous batt 12. Preferably the fibers 20, 21 from the top carrier web 16 are advanced through the batt 12 into the bottom carrier web 18. Similarly, the fibers 20, 21 from the bottom carrier web 18 are advanced through the batt 12 into the top carrier web 16. For this reason the carrier web fibers 20, 21 preferably have a length greater than the thickness of the batt 12 for the resultant composite material 10.

Figure 2:
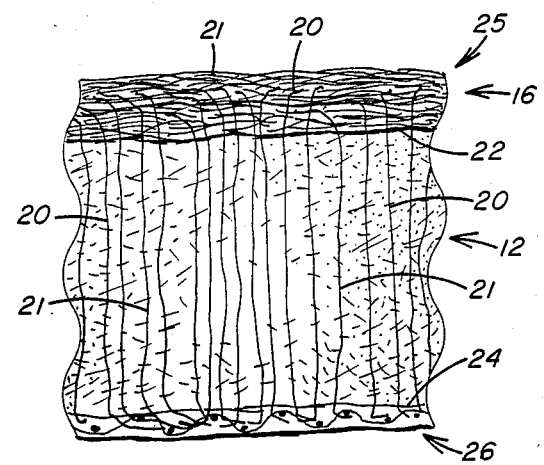
FIG. 2 is a view similar to FIG. 1, illustrating another example of an insulation material formed by needle punching fibers from a top carrier web through a layer of inorganic fibers into locking engagement with a bottom scrim.

In another embodiment, a composite fibrous material 25, shown in FIG. 2, utilizes only a single carrier web 16 positioned on one surface 22 of the inorganic fibrous batt 12. For example, the formed carrier web 16 is advanced or laid into overlying relation on the top surface 22 of the batt 12. When only a single layer of carrier web is utilized, it is preferred that a thin scrim 26 of either woven or nonwoven mesh material is fed into contact with the opposite surface 24 of the batt 12. If the carrier web 16 is positioned on the top surface 22 of the batt 12, then the scrim 26 is positioned in underlying relation with the batt 12.

The layered arrangement of the carrier web (one or more layers) and the inorganic batt as shown in FIGS. 1 and 2 is advanced through a needle loom or a needle felter. A needle loom, as is well known in the art, is a driven reciprocating machine that includes at least one needle board filled with barbed needles. The composite arrangement of materials is horizontally fed under the vertically oscillating needle board. In one method of operation a pair of needle boards are used for the arrangement shown in FIG. 1. The needle boards are vertically reciprocated so that barbed needles simultaneously penetrate the top and bottom carrier webs 16, 18, driving the fibers 20, 21 into engagement with the inorganic fibers 14 to bind them together. In the alternative, the composite material 25 may be needled from only one side, as shown in FIG. 2. Only the top carrier web 16 is needled with the scrim 26 on the opposite side not being needled. However, as with the embodiment shown in FIG. 1, the fibers 20, 21 of the web 16 should be advanced through the batt 12 into the scrim 26.

The barbed needles penetrate the horizontal surfaces of the composite material 10 to perpendicularly align a substantial number of the organic fibers 20 and inorganic fibers 21 from the respective carrier webs 16 and 18 with the batt 12 of inorganic fibrous material. With this process, the composite fibrous material 10 is formed for thermal and/or sound insulation applications with the required properties of mechanical strength and flexibility of the composite material. The loose fibers 14 of the inorganic batt 12 are interlocked or mechanically bonded to one another by the fibers 20 and 21 from the two carrier webs 16 and 18 with the arrangement shown in FIG. 1 or from the single carrier web 16 shown in FIG. 2. Treating the composite material 10 in this manner provides the inorganic fibers 14 of the batt 12 with sufficient mechanical strength to permit handling and installation without splitting or delamination of the inorganic fibrous batt 12. The size of the needles, number and type of barbs, the number of needles, the number of punches per unit area, and the length of penetration of the needles are all controlled during the needling operation to give the composite fibrous material 10, 25 the desired mechanical strength and flexibility.

Prior to the needling operation, the combined layers of the inorganic batt 12 and the carrier webs 16 and 18 have a preselected thickness, for example slightly more than approximately 8 inches. Preferably, before the composite material layers of the carrier webs 16 and 18 and inorganic batt 12 are passed through the needle loom, the layers are compressed by rollers to reduce the total thickness of the composite structure 10 from a thickness of about 8 inches to approximately 4 inches. The composite material is then conveyed through the needle loom to form a resultant nonwoven composite fibrous material 10 in accordance with the present invention having a thickness of about 1 to 2 inches.

Figure 3:
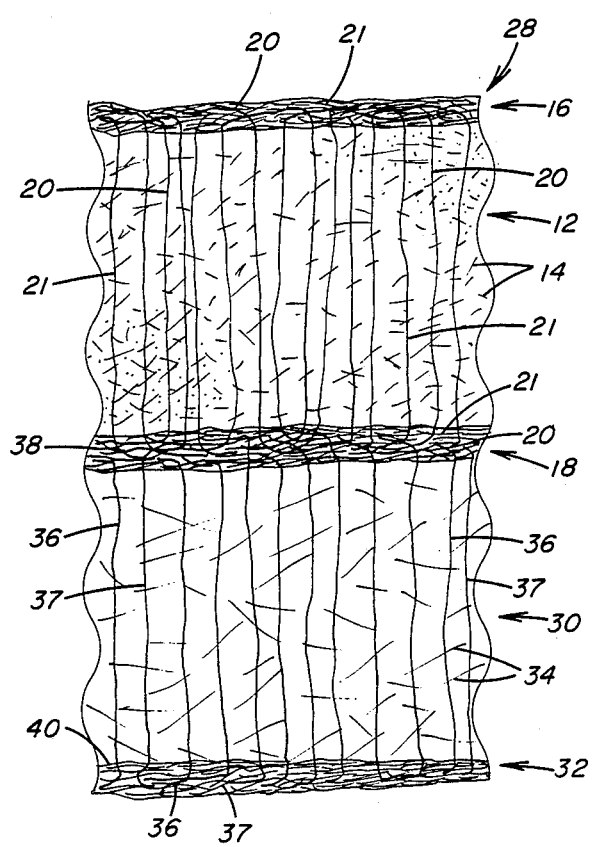
FIG. 3 is a cross sectional view illustrating another embodiment of a nonwoven fibrous insulation material formed by bonding together needled layers of inorganic material separated by a center carrier web in which fibers from upper and lower carrier webs pass through the inorganic layers into engagement with the center carrier web.

Referring to FIG. 3, there is illustrated another embodiment of a nonwoven composite fibrous material 28 in which corresponding elements are identified by the same numbers used in FIG. 1. The fibrous material 28 includes the inorganic batt 12 of fibers 14 connected by needle punching to top and bottom carrier webs 16 and 18 containing a blend of organic fibers 20 and inorganic fibers 21 in the arrangement described above for the fibrous material 10 shown in FIG. 1. This structure is then combined with another composite structure formed by a second inorganic batt 30 which is connected to the carrier web 18 and a lowermost carrier web 32 by needle punching as above described. The inorganic batt 30 shown in FIG. 3 is formed of inorganic fibers 34 selected from the same group of inorganic fibers 14 used in the batt 12. The inorganic fibers 14 and 34 may be the same material or different materials. For example, the fibers 14 could be rock wool fibers while the fibers 34 could be ceramic, glass, or carbon-graphite fibers. Thus, the inorganic fibers for the batts 12 and 30 can be selected to meet specific requirements for the specific application of the composite fibrous material 28.

For use as a thermal insulating material capable of withstanding temperatures of up to 1,300° F., the batt 30 can be fabricated of ceramic fibers 34 with the batt 30 being separated from the heat source by the carrier web 32. The carrier web 32 would also be formed of a blend of organic fibers 36 and ingoranic fibers 37 containing at least about 90% by weight inorganic fibers and up to about 10% by weight organic fibers.

With the arrangement shown in FIG. 3 the carrier webs 16 and 18 are needle punched to the inorganic batt 12 in the manner described for the arrangement shown in FIG. 1. The batt 30 would include a top surface 38 abutting the carrier web 18 and a bottom surface 40 abutting the carrier web 32. By needle punching the carrier web 32 to the batt 30, fibers 36 and 37 from the carrier web 32 are advanced upwardly through the batt 30 and into engagement with the fibers 20 and 21 of the carrier web 18. The fibers 36 and 37 of the carrier web 32 have a length which is greater than the thickness of the batt 30 in the composite fibrous material 28. This assures binding together of the inorganic fibers 34 of the batt 30. Thus, the composite fibrous material 28 is formed by the inter-locked relation of the carrier webs 16, 18 and 32 and the inorganic batts 12 and 30.

Figure 4:
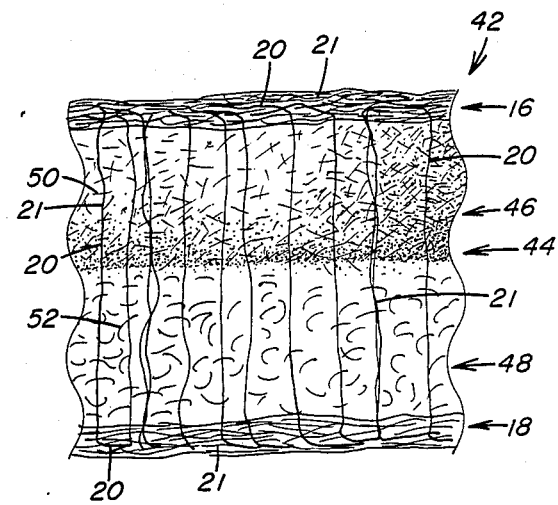
FIG. 4 is a view similar to FIG. 1 of another embodiment, illustrating top and bottom carrier webs needle punched to an inorganic layer formed by a lamination of different types of inorganic fibers.

A modification of the composite fibrous material 28 of FIG. 3 is shown in FIG. 4 in which a composite fibrous material 42 includes the top and bottom carrier webs 16 and 18 of blended organic fibers 20 and inorganic fibers 21 as above described for FIG. 1. Positioned between the carrier webs 16 and 18 is a composite inorganic batt generally designated by the numeral 44. The batt 44 is formed by a plurality of stacked layers of different types of inorganic fibrous material. Two layers 46 and 48 are illustrated in FIG. 4 although additional layers can be utilized.

The first inorganic layer 46 is formed of preselected inorganic fibers 50, such as rock wool fibers, and the second layer 48 is formed of other inorganic fibers 52, such as ceramic, carbon-graphite, metal oxide, and the like. Initially, the two inorganic layers 46 and 48 are stacked together and the carrier webs 16 and 18 are positioned in overlying and underlying relation with the layers 46 and 48 for needle punching of the composite material 44. Both carrier webs 16 and 18 are needle punched to advance the fibers 20 and 21 thereof through the layers 46 and 48. Accordingly, the length of the fibers 20 and 21 is selected to insure that they extend completely through both layers 46 and 48. This arrangement allows one to utilize different characteristics of different types of inorganic fibers 50 and 52 in a batt 44, where, for example, one layer would have a higher resistance to temperature than the other layer.

The following examples are illustrative of the nonwoven composite fibrous material of the present invention:

EXAMPLE 1

The composite fibrous material has a three-dimensional felt-like structure that includes an inorganic fibrous material layer of mineral wool comprising 95% by weight of the composite fibrous material. A top carrier web layer comprises 2.5% by weight of the composite fibrous material, and a bottom carrier web layer comprises 2.5% by weight of the composite fibrous material. Thus both the carrier webs together comprise 5% by weight of the composite fibrous material.

The composite fibrous material has a thickness of about 2 inches and a weight of 1.67 lbs. per sq. ft. The mineral wool layer has a weight of 1.587 lbs. per sq. ft. The top and bottom carrier web layers have a combined weight of 0.083 lbs. per sq. ft.

The top and bottom carrier web layers each include a nonwoven blend of inorganic and organic fibers. The inorganic fibers are glass fibers having a length in excess of two inches. The organic fibers are polyester fibers having a length in excess of two inches. The glass fibers constitute 90% by weight of each carrier web layer, and the polyester fibers constitute 10% by weight of each carrier web layer.

Each carrier web layer has a weight of 0.042 lbs. per sq. ft. The weight of the glass fibers of each layer is 0.038 lbs. per sq. ft. and the weight of the polyester fibers of each layer is 0.004 lbs. per sq. ft. The carrier webs are initially prepared by blending and carding an admixture of glass and polyester fibers which are pretreated to increase the frictional characteristics of the glass fibers and to eliminate the problem of static electricity, as mentioned hereinabove, to facilitate the blending and carding to obtain the desired ratio of 90% by weight glass fibers to 10% by weight polyester fibers for each carrier web.

Initially, the three-dimensional layer of mineral wool fibers includes fibers which are unbonded in a loose layer of about 8 inches thick and having top and bottom surfaces. The carrier webs are fed into overlying and underlying relationship with the layer of mineral wool fibers to form a composite structure. The composite structure is compressed by rollers to a thickness of about 4 inches and is fed through a needle loom that includes upper and lower needle boards equipped with a preselected array of barbed needles.

The needle boards are oscillated at a controlled rate in timed relation with the horizontal feed of the composite material to move the barbed needles into and out of the material and thereby advance the inorganic and organic fibers of the carrier webs into mechanical interengagement with the mineral wool fibers. The mineral wool fibers of the material layer are thus bonded together by the polyester and glass fibers of the carrier web. In this manner a resultant nonwoven composite fibrous material is formed having a desired thickness of about 2 inches and a density of about 1.67 lbs. per sq. ft. The composite fibrous material has a felt-like texture on the top and bottom surfaces and is flexible to the degree to permit handling and installation as both a thermal and sound insulator without experiencing delamination or splitting of the mineral wool fibers.

EXAMPLE 2

A nonwoven composite fibrous material is formed as substantially described in Example 1 in which the inorganic fibrous material is a layer of mineral wool constituting 90% by weight of the entire composite fibrous material. Rather than utilize upper and lower carrier web layers in a sandwich arrangement, a single carrier web layer is positioned on top of the mineral wool layer. The single carrier web layer constitutes 10% by weight of the composite fibrous material.

The mineral wool layer has a weight of 1.503 lbs. per sq. ft., and the single carrier web layer has a weight of 0.167 lbs. per sq. ft. The single carrier web layer is a nonwoven blend of inorganic and organic fibers in which the inorganic fibers are ceramic fibers and the organic fibers are polyester fibers. These inorganic and organic fibers are blended in different percentages by weight than the carrier webs described in Example 1 with there are now being 95% by weight inorganic fibers to 5% by weight organic fibers.

The single carrier web layer is fed into overlying relation with the top surface of the mineral wool layer. A thin scrim of woven glass fiber is fed into underlying relation with the mineral wool layer to support the layer during the needling operation. The composite material is compressed from an 8 inch thickness to a 4 inch thickness and then fed through a needle loom. However, rather than using a pair of needle boards as described in Example 1, only a single needle board is used to advance the fibers of the carrier web downwardly into engagement with the scrim to form an interlocking relation with the mineral wool fibers to bind together the mineral wool fibers. The resultant composite nonwoven fibrous material formed in this manner has a thickness of about 2 inches and density of about 1.67 lbs. per sq. ft.

EXAMPLE 3

A nonwoven composite fibrous material includes the arrangement described in Example 1 where a layer of loose mineral wool fibers is positioned between top and bottom carrier web layers. The carrier web layers include inorganic and organic fibers blended in the same ratio as above described in Example 1 with the exception that, instead of glass fibers, the inorganic fibers of the carrier web are quartz fibers. The density ratios of mineral wool fibers and the carrier webs are the same as described in Example 1. The top and bottom carrier web layers are needle punched into mechanical interengagement with the mineral wool layer to form a nonwoven composite fibrous material having a thickness of 2 inches and a density of 1.67 lbs. per sq. ft.

EXAMPLE 4

A nonwoven composite fibrous material is formed in accordance with Example 1 with the exception that instead of using a single layer of mineral wool fibers for the inorganic batt, a layer of glass fibers is stacked on a layer of carbon-graphite fibers to form a composite inorganic batt. The layers of glass and carbon-graphite fibers are mechanically interlocked with the fibers of the top and bottom carrier web layers by the needle punching operation described in Example 1. The nonwoven composite fibrous material thus formed has the same general thickness and density as described for the composite fibrous material described in Example 1.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A nonwoven composite fibrous material comprising:
    a discrete layer consisting essentially of inorganic fibrous material containing fibers in an unbonded state;
    at least one discrete nonwoven carrier web positioned on a surface of said discrete layer of said inorganic fibrous material;
    said discrete nonwoven carrier web including an admixture of inorganic fibers and organic fibers;
    said inorganic fibers and said organic fibers of said nonwoven discrete carrier web being blended in a nonwoven structure with a preselected thickness and density with said organic fibers of said discrete carrier web comprising about 1% or less by weight of said composite fibrous material; and
    said nonwoven discrete carrier web being needle punched to said discrete layer of said inorganic fibrous material to interlock said inorganic fibers and said organic fibers of said carrier web with said fibers of said layer of inorganic fibrous material so as to bond together said fibers of said inorganic fibrous material and form said nonwoven composite fibrous material which is cohesive and has a mechanical strength and flexibility to resist separation of said fibers of said layer of said inorganic fibrous material upon handling.

2. A nonwoven composite fibrous material as set forth in claim 1, wherein said inorganic fibers comprise at least about 90% by weight of said carrier web and said organic fibers comprise up to about 10% by weight of said carrier web.

3. A nonwoven composite fibrous material as set forth in claim 1, further including
    a first discrete carrier web positioned in contact with a top surface of said layer of said inorganic fibrous material,
    a second discrete carrier web positioned in contact with a bottom surface of said discrete layer of said inorganic fibrous material,
    said first carrier web comprises about 2.5% by weight of said composite fibrous material,
    said second carrier web comprises about 2.5% by weight of the composite fibrous material, and
    said first and said second discrete carrier webs are needle punched into mechanical interengagement with said discrete layer of said inorganic fibrous material.

4. A nonwoven composite fibrous material as set forth in claim 1, wherein said inorganic fibrous material is selected from the group consisting of mineral wool, glass wool, glass fibers, metal oxide fibers, carbon-graphite fibers and ceramic fibers.

5. A nonwoven composite fibrous material as set forth in claim 1, wherein said discrete carrier web is positioned in contact with a top surface of said discrete layer of said inorganic fibrous material and said composite further includes a discrete scrim material positioned in contact with a bottom surface of said discrete layer of said inorganic fibrous material to support said bottom surface as said carrier web is being needle punched, and said carrier web is needle punched into mechanical engagement with said layer of said inorganic fibrous material and into said scrim material.

6. A nonwoven composite fibrous material as set forth in claim 1, wherein said inorganic fibers of said carrier web are selected from the group consisting of glass fibers, metal oxide fibers, carbon-graphite fibers and ceramic fibers.

7. A nonwoven composite fibrous material as set forth in claim 1, wherein said organic fibers of said carrier web are selected from the group consisting of vinylidene chloride fibers, polyolefin fibers, polystyrene fibers, copolymer polystyrene fibers, acrylonitrile fibers, polyamide fibers, polyvinyl-chloride fibers, acetate fibers and polyester fibers.

8. A nonwoven composite fibrous material as set forth in claim 1, wherein a substantial portion of said inorganic fibers and said organic fibers of said discrete carrier web have a length greater than the thickness of said discrete layer of said inorganic fibrous material in said composite fibrous material.

9. A nonwoven composite fibrous material as set forth in claim 8, wherein said composite fibrous material has a thickness of about 1 to 2 inches so that said inorganic fibers and said organic fibers of said discrete carrier web which are needle punched to said discrete layer of said inorganic fibrous material extend completely through said layer.

10. A nonwoven composite insulation material comprising:
    a discrete layer consisting essentially of mineral wool fibers, said layer having a preselected thickness, said mineral wool fibers of said layer being in an unbonded state;
    at least one carrier web for bonding together said mineral wool fibers;
    said carrier web including an admixture of inorganic fibers and organic fibers;
    said inorganic fibers and said organic fibers being blended to form a nonwoven structure with said organic fibers thereof comprising about 1% or less by weight of said composite insulation material;
    said carrier web being positioned with said layer of said mineral wool fibers; and said carrier web being needle punched to said layer of said mineral wool fibers to interlock said inorganic fibers and said organic fibers of said carrier web with said mineral wool fibers so as to bond together said mineral wool fibers and form said nonwoven composite insulation material.

11. A process for making a nonwoven fibrous material comprising the steps of:
blending inorganic fibrous material in a concentration by weight of at least about 90% with organic fibrous material to form at least one composite nonwoven carrier web of carrier fibers having a preselected thickness and density;
positioning said carrier web in contact with a layer of inorganic fibers, said layer comprising an unstructured concentration of said inorganic fibers of a preselected thickness and density; and
needle punching said carrier web to advance said carrier fibers into interlocking relation with said inorganic fibers to bond together said inorganic fibers to form said nonwoven fibrous material having a preselected thickness and density and a content of said organic fibrous material of about 1% or less by weight.

12. A process as set forth in claim 11, wherein said carrier web constitutes as much as about 10% by weight of the total weight of said nonwoven fibrous material while said layer of said inorganic fibers constitutes at least about 90% by weight of said total weight of said nonwoven fibrous material.

13. A process as set forth in claim 11, further including the steps of
positioning a first of said carrier webs into overlying relation with said layer of said inorganic fibers,
positioning a second of said carrier webs into underlying relation with said layer of said inorganic fibers,
needle punching said first carrier web downwardly into mechanical interengagement with said layer of said inorganic fibers, and
needle punching said second carrier web upwardly into mechanical interengagement with said layer of said inorganic fibers to bond together said inorganic fibers to form said nonwoven fibrous material.

14. A process for making a carrier web comprising the steps of:
providing a plurality of inorganic fibers;
providing a plurality of organic fibers;
coating said inorganic fibers to increase the surface friction of said inorganic fibers; and
blending said coated inorganic fibers in a preselected concentration with said organic fibers to form said carrier web having a preselected thickness and density and containing about 10% or less by weight of said organic fibers.

15. A process as set forth in claim 14, wherein said inorganic fibers are coated with a substance selected from the group consisting of starch and silica gel to increase the surface friction of said inorganic fibers.

16. A process as set forth in claim 14, further including the step of coating a surface of said inorganic fibers and a surface of said organic fibers with a preselected agent to eliminate the retention of static electricity on said surfaces.

17. A process as set forth in claim 14, further including the step of increasing a humidity of ambient air surrounding said inorganic fibers and said organic fibers to dissipate static electricity retained by said inorganic fibers and said organic fibers.

18. A process as set forth in claim 14, further including the step of spraying said inorganic fibers and said organic fibers with an anti-static agent prior to said blending.

19. A process as set forth in claim 18, wherein said anti-static agent is water.

* * * * *